Feb. 3, 1925.
1,525,212
C. C. THOMAS
SUPERCHARGER FOR INTERNAL COMBUSTION ENGINES
Filed June 29, 1920
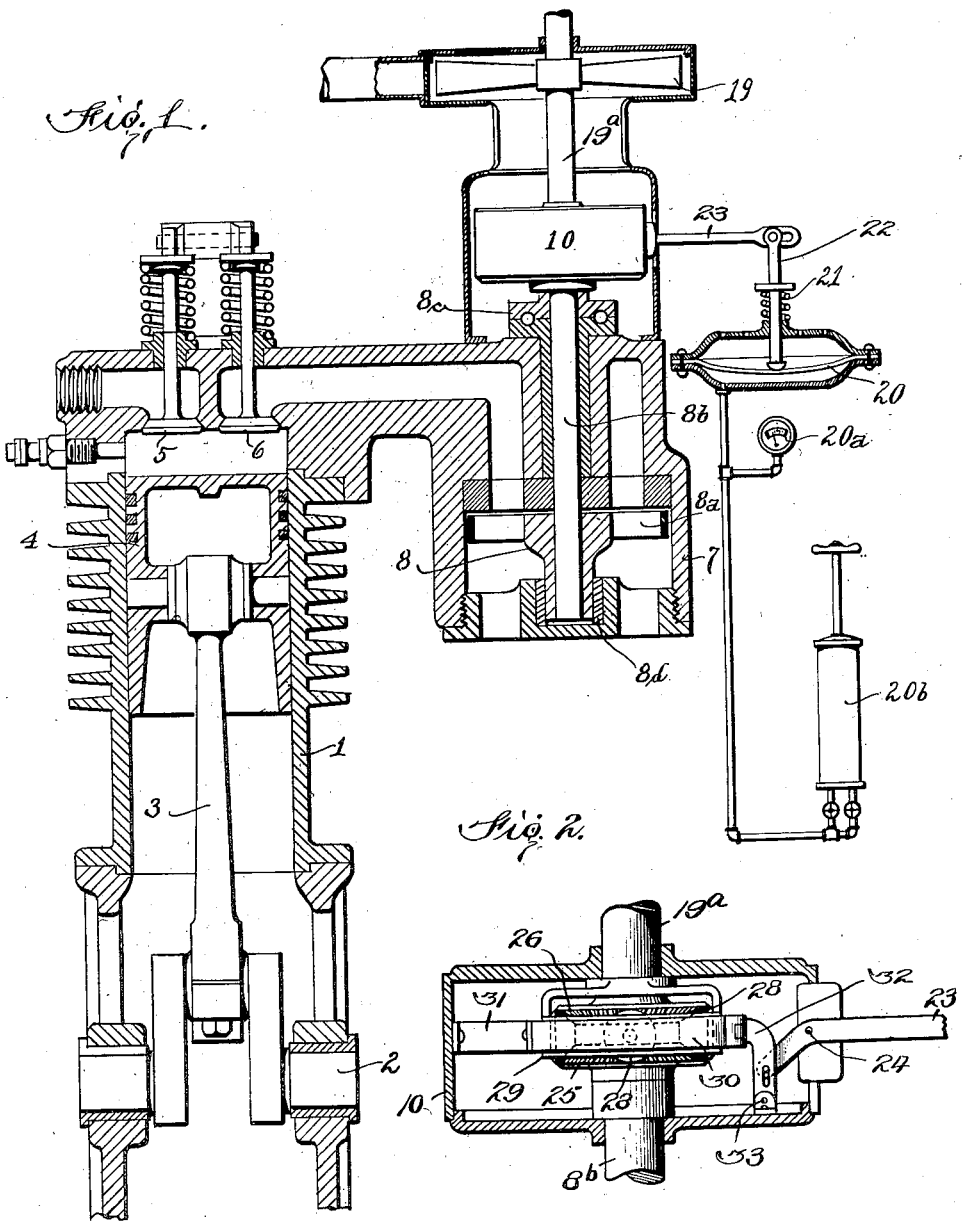

Patented Feb. 3, 1925.

1,525,212

UNITED STATES PATENT OFFICE.

CARL C. THOMAS, OF BALTIMORE, MARYLAND.

SUPERCHARGER FOR INTERNAL-COMBUSTION ENGINES.

Application filed June 29, 1920. Serial No. 392,796.

*To all whom it may concern:*

Be it known that I, CARL C. THOMAS, a citizen of the United States of America, and a resident of the city of Baltimore, State of Maryland, have invented certain new and useful Improvements in Superchargers for Internal-Combustion Engines, of which the following is a specification.

My invention relates to superchargers for internal combustion engines, particularly aeroplane engines, and embodies control means for the supercharger including automatic control means.

In the operation of aeroplanes driven by internal combustion engines, it has been found that an engine adjusted to operate well at from sea level atmospheric pressure to one or two thousand feet elevation, does not work so well at very high elevations. To remedy this condition the so-called supercharger has been developed, the supercharger being a device of the nature of a fan, driven usually by a turbine operated by the exhaust of the engine, which fan or blower forces air under less or greater pressure into the air intake of the engine, the object being to increase the pressure at the intake so that, as atmospheric pressure falls considerably due to increased elevation, the pressure in the air intake is increased to that, or approximately that, pressure, to which the engine is adjusted for operation under normal conditions. But obviously this fan or blower should be arranged to give higher relative pressures as elevation increases; while on the other hand the power of the engine, and therefore the power of the exhaust turbine driving the supercharger, tends to decrease as the elevation of the plane increases; in other words, whereas the power of the turbine driving the supercharger should increase with increased elevation, the contrary is the case, where no special control means is provided.

The object of my invention is, therefore, to vary the power of the turbine driving the supercharger either by hand or automatically, in accordance with the varying demand for power to drive the supercharger, and, more or less approximately, in inverse proportion to the varying atmospheric pressure.

I will now proceed to describe my invention with reference to the accompanying drawings and will then point out the novel features in the claim:

In the said drawing, Figure 1 shows in central vertical section, and more or less diagrammatically an internal combustion engine, in connection with an exhaust turbine, to be operated by that engine, and a supercharger to be driven by that turbine, both these elements being indicated in central vertical section and in the main diagrammatically only, and in connection with the mechanical speed ratio varying device intermediate the exhaust turbine of the supercharger, this speed ratio change device being indicated in elevation and diagrammatically only, and in connection with automatic control means illustrated in part in central vertical section and in part in elevation; and Fig. 2 is a transverse sectional detail view of the speed ratio change device, the same being a conventional illustration of an ordinary well-known planetary frictional transmission.

In the drawings, 1 designates an engine cylinder (shown in this case as an air cooled cylinder provided with the usual radiating ribs), 2 the crank shaft, 3 the connecting rod and 4 the piston.

I have shown an engine of what is known as the four-cycle type, but in a broad sense it is immaterial whether the engine employed be of the four-cycle or of the two-cycle type. Also, I have shown one cylinder only whereas aeroplane engines commonly comprise a number of cylinders; but the principles herein described with reference to the regulation of pressure of the gases driving the turbine, are obviously applicable to any engine, independent of the number of cylinders thereof, so that illustration of the invention as applied to one cylinder only is sufficiently indicative to persons skilled in the art of the application of the invention to multi-cylinder engines of any type.

The engine shown is provided with the usual admission valve 5 and exhaust valve 6.

7 designates the turbine casing, which in this instance is formed integral with, and as a projection from, the removable head of the engine cylinder.

8 designates the rotor of the turbine comprising a series of turbine blades $8^a$ mounted upon the vertical shaft $8^b$ supported by a suitable step-bearing $8^c$, a steadying bearing $8^d$ being provided at the lower end of the rotor.

19 designates the supercharger. As the present invention does not relate to the structure of the supercharger itself, I have illustrated the supercharger diagrammatically only, as a fan, driven from the rotor of the turbine through a change speed gear 10.

This change speed gear may be operated automatically. I have illustrated one automatic means for the purpose comprising a diaphragm 20 exposed on one side to atmospheric pressure and forming on the opposite side a wall of a closed chamber. To this chamber is connected a pressure gauge 20$^a$ and a combined compression pump and exhauster 20$^b$. There is also a spring 21 surrounding the stem 22, tending to force the diaphragm outward in opposition to atmospheric pressure. It may be assumed that when starting from a point at low elevation the chamber behind the diaphragm will be more or less exhausted, the diaphragm, therefore, acting in opposition to the spring; as elevation increases and atmospheric pressure decreases, the diaphragm will eventually be forced out, lifting the stem 22 and rocking the lever 23 on its pivot 24. The adjacent ends of shafts 8$^b$ and 19$^a$ carry bevel gears 25 and 26. A series of bevel pinions 28 carried by a free ring 29 are in mesh with the gears. A flexible brake band or friction band 30, surrounding the ring 29, is secured to a fixed bracket 31 at its center, the ends being attached to the end of a rock arm 32 which is pivoted at 33. The inner short arm of the lever 23 is connected by a pin and slot connection to the rock arm. When the lever 23 is raised, its inner arm will move the rock-arm 32 outwardly, thereby, exerting a pull upon each side of the brake band and causing it to frictionally engage the ring 29 with increasing tightness. It is obvious that when the band is loose, the pinions and ring will revolve with the driving shaft 8$^b$ and no motion will be imparted to the shaft 19$^a$. As the band is gradually compressed against the ring 29, thereby retarding the orbital or planetary motion of the pinions, their axial rotation caused by their engagement with the driving shaft 8$^b$ will cause the rotation of the shaft 19$^a$. When the brake band is tightened sufficiently to completely arrest the motion of the ring 29, the axial rotation of the pinions will cause the shaft 19$^a$ to rotate at the same speed as the shaft 8$^b$. It is apparent, therefore, that as the elevation increases the ratio of drive of the supercharger will increase in proportion and may be increased additionally by the operator by means of the pump, the pressure behind the diaphragm being increased to atmospheric pressure and finally, if so desired, increased beyond atmospheric pressure.

What I claim is:

The combination of an internal combustion engine, a supercharger therefor, means comprising an exhaust driven turbine for driving said supercharger, speed varying means interposed between said supercharger and said driving means, and means operated by varying atmospheric pressure for regulating the operation of said speed varying means.

In testimony whereof I have signed this specification.

CARL C. THOMAS.

Witness:
CLARENCE B. CLEMENTS.